Patented Nov. 21, 1944

2,363,445

UNITED STATES PATENT OFFICE 2,363,445

PACKAGING SPRAY DRIED MILK POWDERS

Helge Shipstead, Syracuse, and Arthur Paul Brant, Little Valley, N. Y., assignors to The Borden Company, New York, N. Y., a corporation of New Jersey No Drawing. Application July 27, 1940, Serial No. 348,038

4 Claims. (Cl. 99—151)

This invention relates to the packaging of spray dried powders that may be damaged by oxidation and more particularly a treatment for spray dried milk powder in bulk and the subsequent packaging thereof under non-oxidizing conditions.

Spray dried milk powder if left exposed to the air at room temperature under normal conditions becomes tallowy and develops an off-taste after a few months. This deterioration in air is caused by oxidation of the protein in the case of skim milk powder, and by the oxidation of the protein and butterfat in the case of milk powders containing butterfat. When a milk powder such as a spray dried whole milk powder is packed in airtight cans and the air in the cans is merely replaced before sealing by carbon dioxide, nitrogen or a mixture of these gases, the keeping quality of the powder is considerably increased, but it gradually develops an off-flavor due to oxidation after a year or so in storage.

Various vacuum and gas treatments of the powder in the containers before they are sealed have been proposed to overcome this difficulty and improve the useful life of the product after packaging. For the most part, however, such improved methods as have been proposed heretofore involve complicated or expensive preliminary treatments with an inert gas, as well as packing the powder in an airtight container filled with an inert gas.

If a prolonged vacuum and gas treatment of the powder in the consumer containers is used, the rate at which the powder can be packaged is necessarily slow. Even when preliminary washing of the powder with an inert gas before packaging is employed, the rate of packaging the powder with a given amount of equipment is not as high as would be desirable and the cost of packaging is fairly high.

One object of our invention is to pretreat spray dried powders without using an expensive inert gas so that the subsequent packaging thereof may be carried out rapidly and still ensure good keeping qualities.

Another object of our invention is to provide a simple preliminary treatment for spray dried milk powders under a vacuum which makes it possible to improve the keeping quality of the product when packaged under a vacuum or with an inert gas and which allows the treated powder to be put up in airtight containers more rapidly and economically.

We have discovered that when spray dried milk powder is subjected in bulk to a relatively high vacuum for a suitable period of time, this milk powder can be packaged quickly and with great saving in labor, even though the powder is again exposed to the air at atmospheric pressure after the preliminary treatment and before the packaging. Extensive flushing of the powder with an inert gas or vacuum holding treatments in the containers just prior to sealing may be eliminated without any sacrifice in the keeping qualities of the product. It is important with such a pre-treatment, however, to make sure that the powder subjected to the preliminary vacuum treatment in bulk is packaged in containers and the containers sealed as soon as practical after the powder in the bulk container is exposed to atmospheric oxygen.

For example, the powder, a spray dried skim milk, partially skimmed milk or whole milk, may be treated in bulk by placing it in a large airtight tank and holding it under a vacuum of around 20 inches of mercury or more for a period of at least about 10 hours. By the application of a vacuum of 20 inches of mercury is meant an absolute pressure of about 10 inches of mercury since 30 inches of mercury is generally considered to be the absolute pressure of one atmosphere. Thereafter, the vacuum may be broken by allowing air to flow into the tank, and the powder is then removed from the large tank and packed in airtight containers. The powder treated should all be sealed in the containers within a period of time after the vacuum is relieved that is substantially less than the holding time under the vacuum in the bulk tank. Should the powder be left exposed to atmospheric oxygen for too long a time after the treatment in bulk under a vacuum, this preliminary treatment, of course, will not produce any substantial benefit.

Even though the powder is exposed to air under atmospheric pressure after the vacuum pretreatment, we have found that this powder keeps for long periods without deterioration after being packed in cans or other suitable containers, preferably filled with suitable non-oxidizing gas before they are sealed. It is not necessary after the milk powder is placed in the containers to subject the powder in the containers to a prolonged vacuum or to long and expensive gas treatments prior to sealing of the containers in order to obtain excellent keeping qualities for the powder. Any suitable packaging method may be used such as filling the cans with the powder, evacuating the cans to fill them with a relatively low oxygen content gas and sealing the cans as will be readily understood by those skilled in the art.

By way of illustration of the invention, good results have been obtained by subjecting spray dried whole milk powder in bulk in a large airtight tank to a vacuum for a period of 18 to 20 hours. The vacuum may be such that the absolute pressure in the tank is only around 5 mm. of mercury. At the end of this holding time, the vacuum in the tank is relieved with air, and the powder is then removed from the tank and packed in cans within 4 hours after the vacuum is relieved. In general, the longer the time of pre-treatment under the vacuum and the shorter the time between relieving this vacuum and sealing of the containers, the better will be the keeping qualities of the product in storage.

Under the particular conditions given above, it has been found that it is possible to package under a given set of conditions and with a given number of packaging machines, more than three times as much spray dried milk powder than can be packaged when the powder is not pretreated but is given a prolonged gas and/or vacuum treatment in the cans sufficient to produce a comparable keeping quality.

The exact manner by which this preliminary vacuum treatment in bulk effects an improved keeping quality of the powder even though it is exposed to the air at atmospheric pressure after the preliminary treatment is not thoroughly understood. We believe, however, that the vacuum treatment in bulk removes combined or occluded oxygen from the powder particles and that very little oxygen is picked up again in this form by the powder between the time the vacuum of the preliminary treatment tank is broken and the packaging of the powder in containers is completed. As a matter of fact, under preferred conditions, this improved combination of vacuum pre-treatment and rapid packaging under non-oxidizing conditions actually produces an improvement in the keeping qualities of the product over the more laborious and expensive packaging methods used heretofore.

It will be apparent that the invention does not depend for its success on any particular conditions of time or degree of vacuum, provided that the vacuum applied is sufficient to condition the powder during the time of application. Thus, it may be desirable to use higher vacuums for shorter holding times, and conversely the vacuum does not have to be so high if the holding time is sufficiently long. The net benefit derived will depend primarily on the combination of the degree of vacuum applied, holding time of this vacuum and time of exposure to air after the vacuum treatment.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In a method of packaging a spray dried milk powder subject to deterioration by oxidation, the steps which comprise subjecting said powder in bulk and before packaging to a vacuum corresponding to an absolute pressure of not more than 10 inches of mercury for a period of not less than 10 hours, relieving the vacuum with air and packaging the powder in consumer containers under non-oxidizing conditions within a period which is substantially less than the period of vacuum treatment.

2. In a method of packaging spray dried milk powder subject to deterioration by oxidation, the steps which comprise subjecting said milk powder in bulk and before packaging to a vacuum corresponding to an absolute pressure of not more than 10 inches of mercury for a period of not less than 10 hours, releasing the vacuum with air after said period, and packaging said powder in consumer containers with a non-oxidizing gas within a period of 4 hours after the exposure of said powder to air.

3. A process of packaging spray dried whole milk powder to improve the keeping qualities thereof which comprises subjecting spray dried whole milk powder in bulk and before packaging in a large airtight tank to a vacuum corresponding to an absolute pressure of not more than 5 mm. of mercury or a lesser absolute pressure, releasing the vacuum with air after a period of not less than 18 hours, removing the powder from the tank in an atmosphere of air, and packaging said powder under non-oxidizing conditions in airtight containers within a period of 4 hours after releasing the vacuum.

4. In a method of packaging spray dried milk powder, the steps comprising subjecting milk powder in bulk and before packaging to a vacuum corresponding to an absolute pressure of not more than 10 inches of mercury for a period of not less than 10 hours, relieving the vacuum with air and, within a period of 4 hours, placing the powder in individual containers, evacuating said containers with the powder therein, charging said containers with a relatively non-oxidizing gas and sealing the containers.

HELGE SHIPSTEAD.
ARTHUR PAUL BRANT.